IMPEDANCE CONTROLLED REACTOR DEVICE

Filed Dec. 1, 1961

INVENTOR.
MARCEL A. PAHLAVAN
BY Lyon & Lyon
ATTORNEYS

United States Patent Office 3,182,249

Patented May 4, 1965

3,182,249

IMPEDANCE CONTROLLED REACTOR DEVICE

Marcel A. Pahlavan, Los Angeles, Calif. (% Aerospace Products Research Corp., 1429A Lincoln Blvd., Santa Monica, Calif.)

Filed Dec. 1, 1961, Ser. No. 156,350
11 Claims. (Cl. 323—87)

This invention relates to control circuits, and, more particularly, to improvement therein.

A problem arises in designing a control circuit for controlling the energy applied across a load, consisting of electro-luminescent material, where the signals for controlling such energy range in amplitude from very small to very large values, for example, over a range of more than 1000 to 1. The control circuit must be sufficiently sensitive to operate in response to the low values of the control signal and sufficiently insensitive to be unaffected by the large values of the control signal. Furthermore the variations in control-signal amplitude may not be reflected into the energy delivered across the electro-luminescent load.

An object of this invention is the provision of a novel control circuit.

Another object of this invention is the provision of a control circuit which is sufficiently sensitive to respond to low-amplitude control signals and yet is not adversely affected by large-amplitude control signals.

Another object of the present invention is the provision of a control circuit wherein variations in the control signal are isolated from the energy being controlled.

Still another object of the present invention is the provision of a novel, useful, and simple control circuit.

These and other objects of the invention may be achieved by providing a control circuit including a transformer, preferably of the saturable type, which has a primary winding and at least one secondary winding. An alternating-current source provides the energy which is to be controlled. This alternating-current source is connected to the primary winding. The load is coupled to the primary winding, to derive energy therefrom. A transistor circuit is coupled to the secondary winding and is rendered either conductive or nonconductive to effectively short the secondary winding or not short it, whereby the impedance of the primary winding and the energy supplied to the load may be controlled. The transistor circuit includes a transistor having its collector connected to one side of the secondary winding and its emitter to the other side of the secondary winding. Control signals are applied to the base of this transistor through a circuit including a diode means which has the property that regardless of the amplitude of the signal which is applied thereto it provides an output current on the order of microamperes which is sufficient to enable the transistor coupled across the secondary winding to be driven into saturation.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Although, as previously indicated, the control circuit comprising this invention was developed for controlling the application of energy to electro-luminescent loads, this should not be taken as a limitation upon the invention, since to those skilled in the art it will have use with a wide variety of other types of loads.

Figure 1:
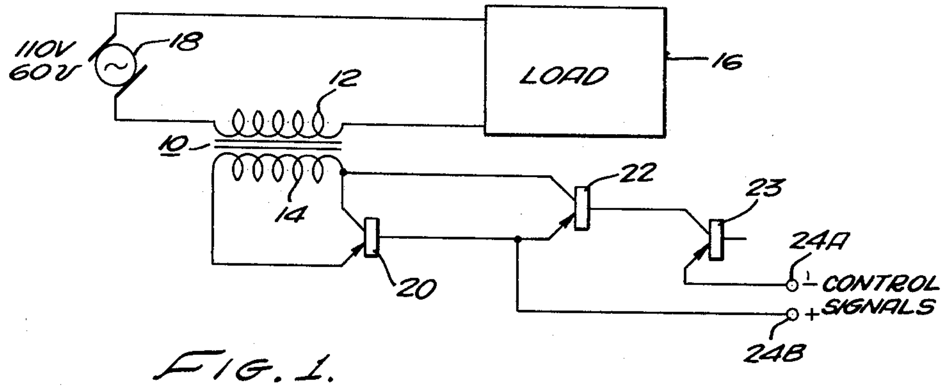
FIGURE 1 is a circuit diagram of an embodiment of the invention.

Reference is now made to FIGURE 1, which is a circuit diagram of an embodiment of this invention. This includes a saturable transformer 10, having a primary winding 12 and a secondary winding 14. A load 16 is connected in series with the primary winding 12 and a source of energy, which here is an alternating-current source 18, is connected to provide energy across the serially connected load 16 and primary winding 12.

The impedance of the primary winding 12 is controlled by circuitry connected to the secondary winding 14. This comprises a first transistor 20, having its collector connected to one side of the secondary winding 14 and its emitter connected to the other side of the secondary winding 14. A second transistor 22 has its emitter connected to the base of the first transistor 20 and its collector connected to the collector of the first transistor 20.

A circuit element is connected in series with the base of the transistor 22. This circuit element may be termed a leaky diode. It has the property that regardless of the amplitude of the voltage applied thereto in the reverse direction the current that flows therethrough is on the order of a few microamperes. This leaky diode may comprise a third transistor 23, having its collector connected to the base of the second transistor 22, and its emitter connected to an input terminal 24A of the pair of input terminals 24A, 24B, to which control signals are applied. The input terminal 24B is connected to the junction of the base of transistor 20 and emitter of transistor 22. The connection of the transistor 23 to the base of transistor 22 is in reverse to the connection of easy current flow. Effectively, it presents a high impedance to the source of control signals.

In operation, in the absence of control signals applied to the input terminals 24A, 24B, transistor 20 is nonconductive and, as a result, the impedance of the primary winding 12 is high. Therefore, the energy delivered to the load 16 is low. Upon the application of a control signal to the terminals 24A, 24B, current on the order of a few microamperes flows through the transistor 23, which is amplified by transistor 22. This signal is applied to transistor 20 and is sufficient to render transistor 20 conductive in saturation. As a result, effectively a short circuit is connected across the transformer secondary winding 14, a large current flows therein, and the primary winding 12 presents a low impedance between the load 16 and the energy source 18. As a result, a large amount of energy may be delivered to the load, and if it is an electro-luminescent type of load it will fluoresce.

Figure 3:
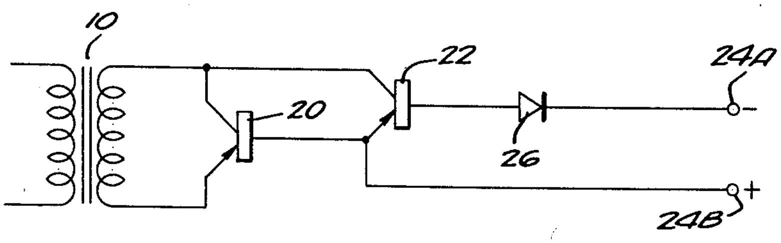
FIGURE 3 is a circuit diagram showing the use of an alternative diode means in the embodiment of the invention.

The transistor 23 may be replaced by a diode which has the property that it will leak a few microamperes of current, despite the amplitude of the signal applied to it with a reverse polarity, or in the direction in reverse to the direction of easy current flow therethrough. This is shown in FIGURE 3, where the diode 26 is shown inserted in the circuit in place of the transistor 23. The diode is connected in the direction in reverse to that of easy current flow therethrough. A power silicon diode can operate satisfactorily in accordance with the requirements specified.

Figure 2:
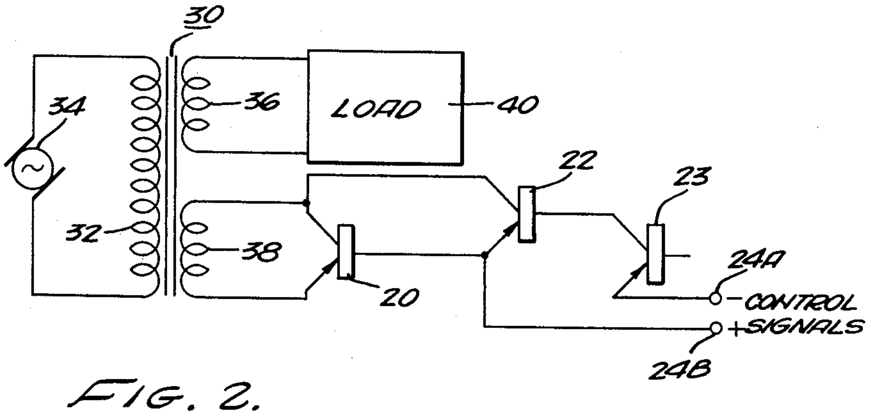
FIGURE 2 is a circuit diagram of another embodiment of the invention.

Reference is now made to FIGURE 2, which shows another arrangement for an embodiment of the invention. Here a transformer 30 of the saturable type has its primary winding 32 connected to the power source 34. The transformer 30 has two secondary windings, respectively 36, 38. The load 40 is connected to one of these secondary windings 36. Control circuitry, which is identical with the type shown in FIGURE 1 and accordingly bears similar reference numerals, is connected to the secondary winding 38.

In the absence of control signals being applied to the input terminals, the load 40 has energy applied thereto. Upon the application of a control signal to the input terminal 24A, 24B, the diode-connected transistor 23 applies sufficient current to the base of transistor 22 to enable it to drive the transistor 20 into saturation. A large current flows through the winding 38 and, as a result, the transformer 30 is saturated, whereby the impedance of winding 32 is lowered and the amount of energy transferred into the circuit, including the secondary winding 36 and the load 40, is considerably reduced. If the load 40 is an electro-luminescent load, the voltage applied thereto from the winding 36 is reduced below the amount required to cause the electro-luminescent material to luminesce.

The impedance presented by the input of this control circuit is high, despite the fact that transistors are used in the circuit. This is achieved by reason of the manner of operation of the diode in said input circuit. Variations in control signals are not reflected into the energy supplied to the load.

There has accordingly been described and shown herein a novel, simple, and useful control circuit.

I claim:

1. A control circuit comprising a saturable transformer having a primary winding and a secondary winding, means for applying current to said primary winding, a load, means coupling said load to said primary winding to derive energy, and means for controlling the impedance of said primary winding including a first and second transistor, each having a collector, emitter, and base electrode, means connecting the collector electrodes of said first and second transistors to one end of said secondary winding, means connecting the emitter of said first transistor to the other end of said secondary winding, means connecting the base of said first transistor to the emitter of the second transistor, and means including an impedance to apply a control signal between the base electrodes of said first and second transistors to control the conductive condition of said first and second transistors.

2. A control circuit comprising a saturable transformer having a primary winding and a secondary winding, a load connected in series with one side of said primary winding, means for applying current to said series-connected load and primary winding, and means for controlling the imepdance of said primary winding including a first and second transistor, each having a collector, emitter, and base electrode, means connecting the collector electrodes of said first and second transistors to one end of said secondary winding, means connecting the emitter of said first transistor to the other end of said secondary winding, means connecting the base of said first transistor to the emitter of the second transistor, and means including an impedance to apply a control signal between the base electrodes of said first and second transistors to control the conductive condition of said first and second transistors.

3. A control circuit as recited in claim 2 wherein said impedance included in said means to apply a control signal between the base electrodes of said first and second transistors includes a diode connected in series with the base of said second transistor with a polarity in reverse to the direction of easy current flow, said diode having the property that current on the order of microamperes will flow despite amplitude variations in control-signal amplitude.

4. A control circuit as recited in claim 3 wherein said diode constitutes the collector and emitter of a transistor.

5. A control circuit comprising a saturable transformer having a primary and a first and second secondary winding, means for applying current to said primary winding, a load connected to said first secondary windnig, and means for controlling the impedance of said primary winding including a first and second transistor, each having a collector, emitter, and base electrode, means connecting the collector electrodes of said first and second transistors to one end of said second secondary winding, means connecting the emitter of said first transistor to the other end of said second secondary winding, means connecting the base of said first transistor to the emitter of said second transistor, and means to apply a control signal between the base electrodes of said first and second transistors to control the conductive condition of said first and second transistors.

6. A control circuit as recited in claim 5 wherein said impedance included in said means to apply a control signal between the base electrodes of said first and second transistors includes a diode connected in series with the base of said second transistor with a polarity in reverse to the direction of easy current flow, said diode having the property that reverse current on the order of microamperes will flow despite amplitude variations in control-signal amplitude.

7. A control circuit as recited in claim 6 wherein said diode constitutes the collector and emitter of a transistor.

8. A control circuit comprising a saturable transformer having a primary and a secondary winding means for applying current to said primary winding, a load, means coupling said load to said primary winding to derive energy therefrom, means for controlling the impedance of said primary winding connected to said secondary winding including a transistor having emitter, collector, and base electrodes, means connecting said emitter to one end of said secondary winding, means connecting said collector to the other end of said secondary winding, and means for applying a control signal to said base electrode to determine the state of conduction of said transistor including a diode having the property that a voltage applied thereto with a polarity in reverse to that of easy current flow provides a current on the order of microamperes.

9. A control circuit as recited in claim 8 wherein said diode is a transistor having its emitter and collector connected as a diode.

10. A control circuit comprising a saturable transformer having a primary winding and a secondary winding, a load connected in series with one side of said primary winding, means for applying current to said series-connected load and primary winding, and means for controlling the impedance of said primary winding including a first and second transistor, each having a collector, emitter, and base electrode, means connecting the collector electrodes of said first and second transistors to one end of said secondary winding, means connecting the emitter of said first transistor to the other end of said secondary winding, means connecting the base of said first transistor to the emitter of the second transistor, a third transistor having collector, emitter, and base electrodes, means connecting said third transistor collector to said second transistor base, and means to apply a control signal between said second and third transistor emitters with a polarity in reverse to the direction of easy current flow through said third transistor emitter and collector.

11. A control circuit comprising a saturable transformer having a primary and a first and second secondary winding, means for applying current to said primary winding, a load connected to said first secondary winding, and means for controlling the impedance of said primary winding including a first and second transistor, each having a collector, emitter, and base electrode, means connecting the collector electrodes of said first and second transistors to one end of said second secondary winding, means connecting the emitter of said first transistor to the other end of said second secondary winding, means connecting the base of said first transistor to the emitter of said second transistor, a third transistor having collector, emitter, and base electrodes, means connecting said third transistor collector to said second transistor base, and means to apply a control signal between said second and third transistor emitters with a polarity in reverse to the direction of easy current flow through said third transistor emitter and collector.

References Cited by the Examiner

UNITED STATES PATENTS

| | | | |
|---|---|---|---|
| 2,767,330 | 10/56 | Marshall | 323—22 |
| 2,933,673 | 4/60 | Jones et al. | 323—86 |
| 2,955,230 | 10/60 | Ett | 323—56 X |

LLOYD McCOLLUM, *Primary Examiner.*